(12) United States Patent
Brolli et al.

(10) Patent No.: US 10,167,097 B2
(45) Date of Patent: Jan. 1, 2019

(54) APPARATUS FOR FORMING GROUPS OF PRODUCTS

(71) Applicant: Cavanna S.p.A., Prato Sesia (Novara) (IT)

(72) Inventors: Elio Brolli, Prato Sesia (IT); Valerio Alotto, Prato Sesia (IT); Agostino Iossa, Prato Sesia (IT)

(73) Assignee: CAVANNA S.P.A., Prato Sesia (Novara) (IT)

( * ) Notice: Subject to any disclaimer, the term of this patent is extended or adjusted under 35 U.S.C. 154(b) by 0 days.

(21) Appl. No.: 15/957,755

(22) Filed: Apr. 19, 2018

(65) Prior Publication Data
US 2018/0319522 A1 Nov. 8, 2018

(30) Foreign Application Priority Data

May 3, 2017 (IT) .......................... 102017000047435

(51) Int. Cl.
| | |
|---|---|
| B65B 23/14 | (2006.01) |
| B65B 23/18 | (2006.01) |
| B65B 35/32 | (2006.01) |
| B65B 35/46 | (2006.01) |
| B65G 47/08 | (2006.01) |
| B65G 47/38 | (2006.01) |
| B65G 47/244 | (2006.01) |

(52) U.S. Cl.
CPC .............. *B65B 23/14* (2013.01); *B65B 23/18* (2013.01); *B65B 35/32* (2013.01); *B65B 35/46* (2013.01);
(Continued)

(58) Field of Classification Search
CPC ......... B65B 23/14; B65B 23/18; B65B 35/32; B65B 35/46; B65B 2220/14; B65G 47/08;
(Continued)

(56) References Cited

U.S. PATENT DOCUMENTS 4,159,761 A * 7/1979 Egee ....................... B65B 5/101
414/788.5
4,236,855 A * 12/1980 Wagner ................... B65B 25/08
414/789.5
(Continued)

FOREIGN PATENT DOCUMENTS

EP 1431186 A2 6/2004

OTHER PUBLICATIONS

Italian Search Report and Written Opinion dated Dec. 11, 2017 for Application No. IT201700047435.

*Primary Examiner* — Mark A Deuble
(74) *Attorney, Agent, or Firm* — Patterson & Sheridan, LLP

(57) ABSTRACT

An apparatus for the transverse welding of a tape traveling in a machine direction, comprising: a stationary structure, a rotary structure rotatable with respect to the stationary structure about a rotation axis perpendicular to said machine direction, a plurality of welding units carried by said rotary structure and spaced apart in a circumferential direction, wherein each of said welding units comprises an inner welding element fixed relative to the rotary structure and an outer welding element cyclically movable with respect to the rotary structure between a release position and an operative position, and vice versa, wherein each of said outer welding elements during the movement from said release position to said operative position, and vice versa, performs an angular rotation movement about a respective radial axis perpendicular to said rotation axis, and a linear translation movement along said radial axis.

7 Claims, 11 Drawing Sheets

(52) U.S. Cl.
    CPC ........... *B65G 47/082* (2013.01); *B65G 47/38* (2013.01); *B65B 2220/14* (2013.01); *B65G 47/244* (2013.01)

(58) Field of Classification Search
    CPC .... B65G 47/082; B65G 47/244; B65G 47/32; B65G 47/38
    USPC ................. 198/418.2, 418.3, 418.6, 431
    See application file for complete search history.

(56) References Cited

U.S. PATENT DOCUMENTS

| | | | | |
|---|---|---|---|---|
| 4,590,743 | A | | 5/1986 | Hardage |
| 4,807,741 | A | | 2/1989 | Simelunas et al. |
| 5,460,843 | A | * | 10/1995 | Greene ................. B65B 23/14 426/121 |
| 5,595,280 | A | * | 1/1997 | Spatafora ............... B65B 23/14 198/429 |
| 6,918,736 | B2 | * | 7/2005 | Hart ........................ B65B 5/10 414/788.9 |
| 8,622,196 | B1 | * | 1/2014 | Lapointe ............... B65G 33/06 198/383 |
| 2006/0108198 | A1 | * | 5/2006 | Guidetti ................ B65B 23/14 198/431 |
| 2015/0068159 | A1 | * | 3/2015 | Barkemeyer .......... B65B 29/00 53/443 |
| 2015/0217886 | A1 | * | 8/2015 | Blanz .................... B65B 23/14 198/418.9 |

\* cited by examiner

APPARATUS FOR FORMING GROUPS OF PRODUCTS

CROSS-REFERENCE TO RELATED APPLICATIONS

This application claims benefit of Italian patent application number 102017000047435, filed May 3, 2017 which is herein incorporated by reference.

BACKGROUND OF THE INVENTION

Field of the Invention

The present invention refers to the packaging of products, in particular of food products such as biscuits or the like.

More precisely, the invention relates to an apparatus for forming groups of products.

Description of Prior Art

Baked products, such as biscuits or the like, can be placed on a belt conveyor at the outlet of an oven, aligned in longitudinal rows and in transverse rows. The products can have a main surface resting on a horizontal transport surface of the conveyor.

The packaging of relatively thin products, such as biscuits or the like, can envisage the grouping of products into groups, also called "slugs" in which the products are arranged on edge, i.e. with the respective main surfaces oriented vertically and parallel to each other.

A technique that can be used to form groups of products coming from a flow of products at the outlet of an oven can involve inserting the products into a plurality of stationary channels, in which the products are arranged on edge with respective main surfaces in contact with each other. The channels containing respective stacks of products can be inclined so as to direct the products arranged on edge—by gravity—towards an outlet end. At the outlet ends, individual products can be extracted, which are grouped into groups formed by a pre-established number of products.

In systems for forming groups of products, it may be necessary to provide extractor devices that individually extract products from the channels in which the products are arranged on edge in contact with each other. Solutions of this type can be bulky and may involve risks of damaging products during the formation of groups.

SUMMARY OF THE INVENTION

The present invention aims to provide an apparatus for forming groups of products that is compact and reduces the risk of damage to the products.

According to the present invention, this object is achieved by an apparatus for forming groups of products having the characteristics forming the subject of claim 1.

The claims form an integral part of the disclosure provided here in relation to the invention.

BRIEF DESCRIPTION OF THE DRAWINGS

The present invention will now be described in detail with reference to the attached drawings, given purely by way of non-limiting example, wherein.

It will be appreciated that, for clarity and simplicity of illustration, the various Figures may not be reproduced on the same scale.

DETAILED DESCRIPTION

The following description illustrates various specific details in order to provide a thorough understanding of various embodiment examples. The embodiments can be obtained without one or more of the specific details, or with other methods, components, materials, etc. In other cases, known structures or components are not illustrated or described in detail so that the various aspects of the embodiments and not rendered unclear.

The reference to "an embodiment" in the context of the present description indicates that a particular configuration, structure or characteristic described in relation to the embodiment is included in at least one embodiment. Thus, sentences such as "in an embodiment", which may be present at various points in the present description, do not necessarily refer to exactly the same embodiment. Moreover, particular configurations, structures or characteristics can be combined in any suitable way in one or more embodiments. The references used here are provided simply for convenience and therefore do not define the field of protection or scope of the embodiments.

Figure 1:
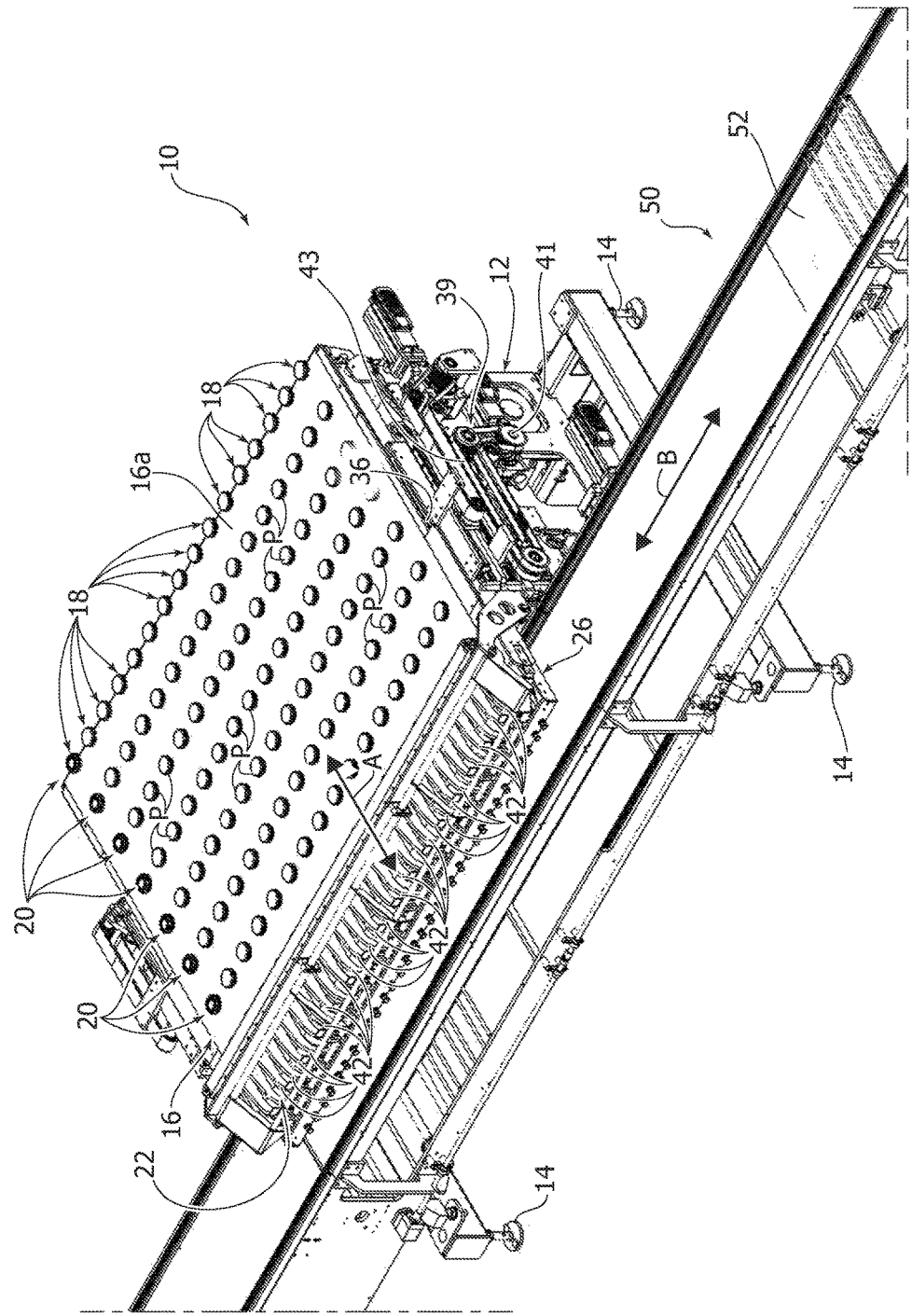
FIG. 1 is a perspective view illustrating an apparatus for forming groups of products according to the present invention.
Figure 2:
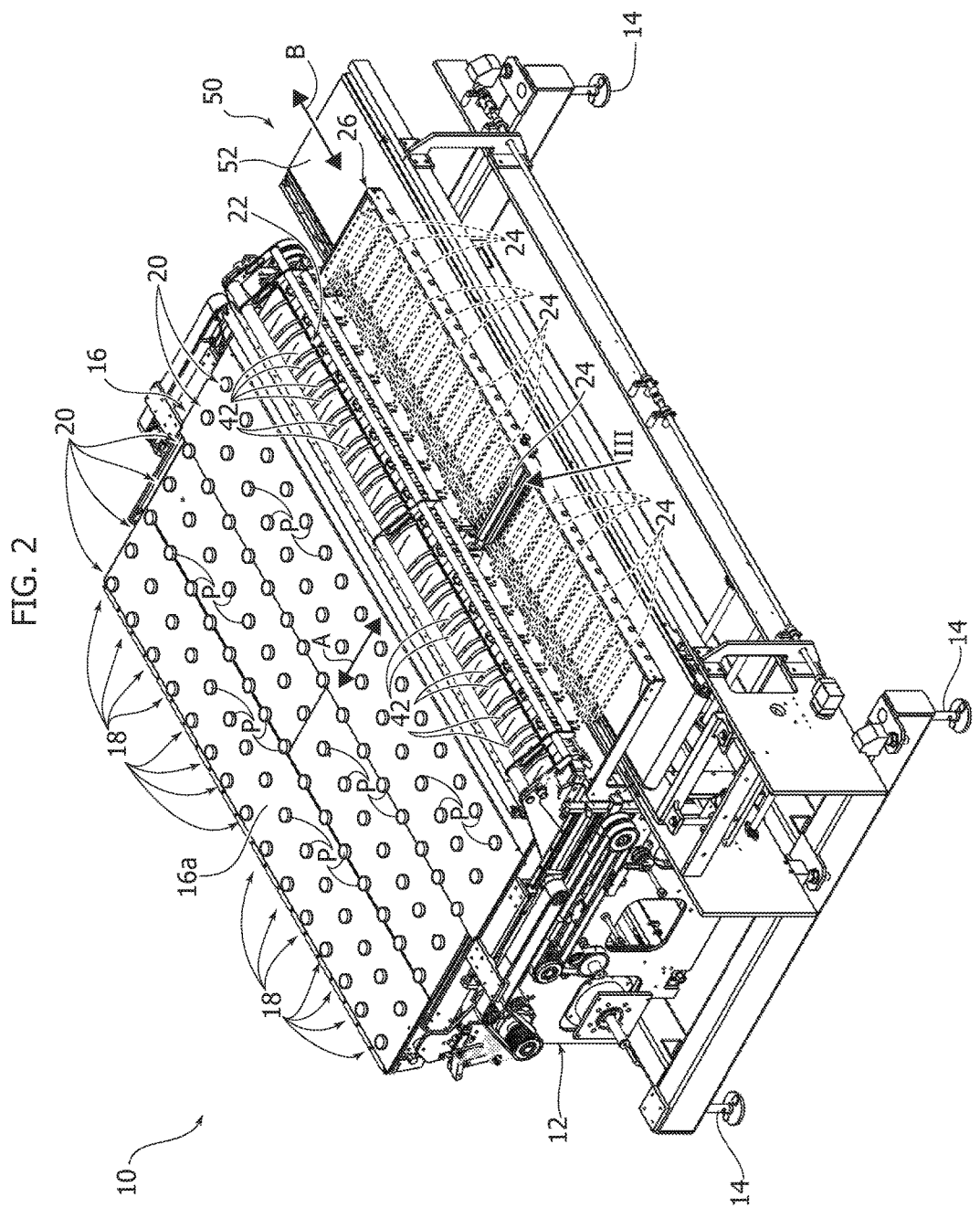
FIG. 2 is a perspective view in a different position and with a different angulation of the apparatus of FIG. 1.

In FIGS. 1 and 2, numeral 10 indicates an embodiment of an apparatus for forming groups of products. The apparatus 10 comprises a stationary supporting structure 12 that rests on the ground by means of feet 14.

The apparatus 10 comprises a belt conveyor 16 having a horizontal transport surface 16a movable in a longitudinal direction A. Products P are arranged on the transport surface 16a of the belt conveyor 16. The products P rest on the transport surface 16a with one of their main surfaces. The products P are aligned with each other in a plurality of longitudinal rows 18 parallel to the longitudinal direction A, and in a plurality of transverse rows 20 orthogonal to the longitudinal direction A. The products P are spaced apart by a constant pitch in the longitudinal direction A.

In one or more embodiments, the transport surface 16a of the belt conveyor 16 terminates at an outlet edge 22 where the products P advancing on the transport surface 16a fall by gravity.

In one or more embodiments, the apparatus 10 comprises a plurality of receiving elements 24 (FIGS. 2-4) arranged to receive the products P falling from the outlet edge 22 of the belt conveyor 16. In one or more embodiments, the receiving elements 24 can be aligned with respective longitudinal rows 18. In one or more embodiments, the receiving elements 24 can be parallel to each other in a transverse direction B orthogonal to the longitudinal direction A. In one or more embodiments, the receiving elements 24 can be carried by a frame 26 carried by the supporting structure 12 of the apparatus 10. In one or more embodiments, the frame 26 can be movable in a vertical direction between a receiving position of the products P and a position for releasing the groups of products.

Figure 3:
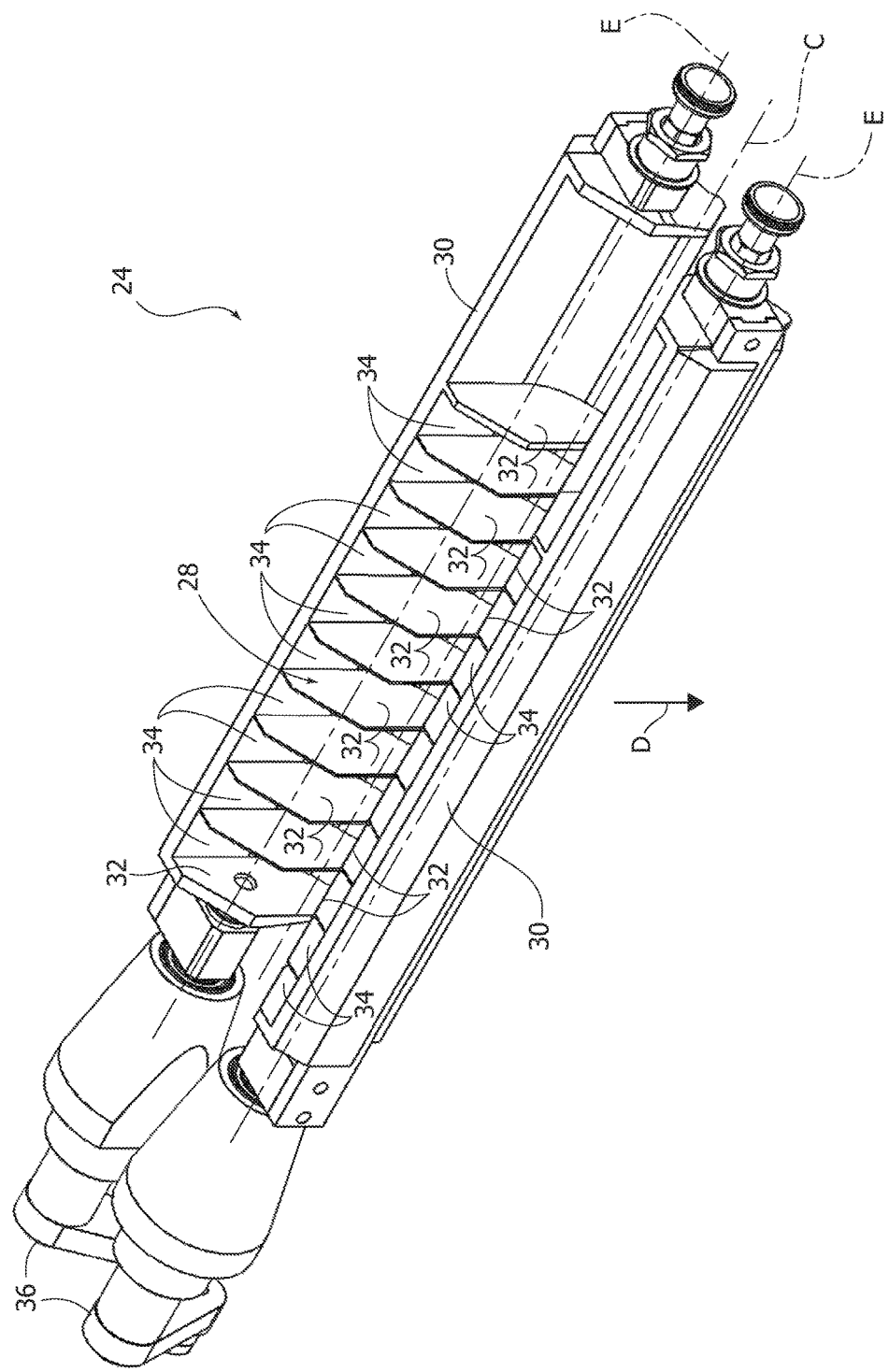
FIGS. 3 and 4 are perspective views of a receiving element indicated by the arrow III in FIG. 2, respectively in the closed position and in the open position.
Figure 4:
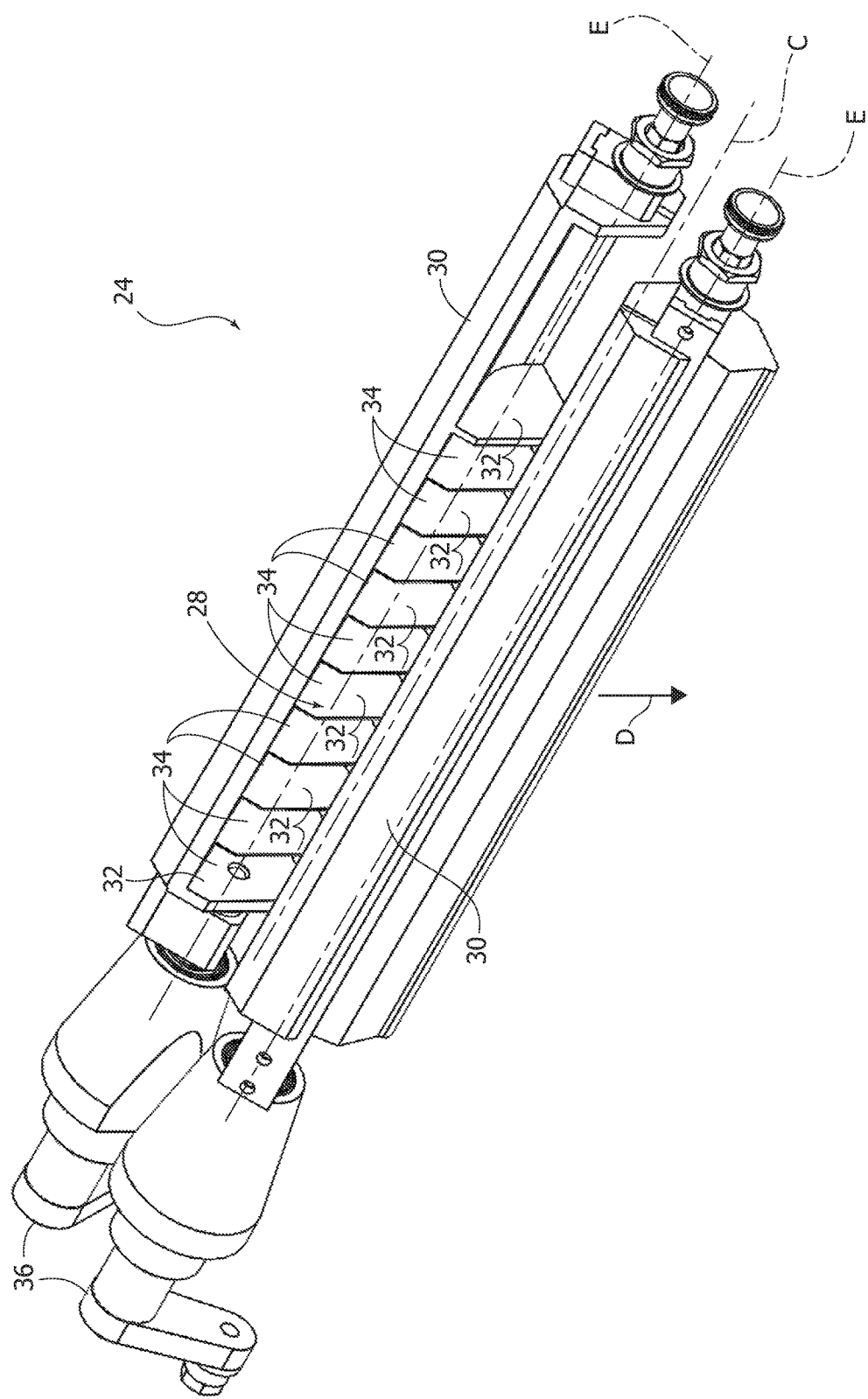

With reference to FIGS. 3 and 4, in one or more embodiments, each of the receiving elements 24 can have a respective seat 28 elongated along a respective axis C parallel to the longitudinal direction A. The axes C of the receiving elements 24 can be parallel to each other in a horizontal plane.

The receiving elements 24 are movable between a closed position illustrated in FIG. 3 and an open position illustrated in FIG. 4. In the closed position, the receiving elements 24 are configured to receive and retain products P in the respective seats 28. In the open position the receiving elements 24 are configured to release respective groups of products in a vertical direction.

With reference to FIGS. 3 and 4, in one or more embodiments, each of the receiving elements 24 can comprise two sections 30 that are rotatable about respective axes E between a closed position and an open position. In the closed position, the sections 30 have respective lower edges alongside each other so as to prevent the products contained in the seat 28 from falling. In the open position, the lower edges of sections 30 are moved away from each other to allow the group of products contained in the seat 28 to fall in the vertical direction indicated by the arrow D.

In one or more embodiments, each receiving element 24 can be provided with septa 32 orthogonal to the axis C, which divide the seat 28 into a plurality of compartments 34 configured to receive respective products P arranged on edge. Alternatively, the seat 28 can be without compartments and can be designed to receive the products P arranged on edge with their respective main surfaces in contact with each other.

In one or more embodiments, the sections 30 of the receiving elements 24 can be rotatably moved from the frame 26 and can be connected to respective actuating members 36, which control the oscillation of the sections 30 about the axes E between the closed position and the open position, and vice versa.

In one or more embodiments, the outlet edge 22 and the receiving elements 24 can be provided with a stepped relative movement in the longitudinal direction A, so that the products that fall off the outlet edge 22 are received in offset positions into the seats 28 of the receiving elements 24. This relative movement can be obtained by keeping the frame 26 carrying the receiving elements 24 in a stationary position in the longitudinal direction A and moving the outlet edge 22 in the longitudinal direction A, or by keeping the outlet edge 22 still in the longitudinal direction A and moving the frame 26 carrying the receiving elements 24 in the longitudinal direction A.

Hereinafter, the embodiment will be described that involves producing said relative movement, keeping the frame 26 still in the longitudinal direction A, and moving the outlet edge 22 of the belt conveyor 16 in steps in the longitudinal direction A.

With reference to FIGS. 5-11, in one or more embodiments the belt conveyor 16 comprises a slide 37 movable in steps in the longitudinal direction A and on which the belt carrying the products P is wound. The slide 37 can have an arcuate terminal 38 defining the outlet edge 22 of the belt conveyor 16.

With reference to FIG. 1, in one or more embodiments the movement of the slide 37 in the longitudinal direction A can be controlled by a transmission belt 39 including a pulley 41 driven by an electric motor and a belt 43 with a horizontal branch fixed to the slide 37.

In one or more embodiments, the apparatus 10 comprises a plurality of guide devices 40 associated with respective receiving elements 24. The guide devices 40 are arranged to guide the products P of respective longitudinal rows 18 into respective receiving elements 24.

In one or more embodiments, the guide devices 40 are arranged so as to rotate the products P falling from the outlet edge 22 of the belt conveyor 90 by 90°. In one or more embodiments, the products P which rest with a main surface on the transport surface 16a of the belt conveyor 16 are rotated by 90° at the outlet edge 22 and are positioned within the respective receiving elements 24 on edge, i.e. with the main surfaces of the products P oriented vertically.

In one or more embodiments, each guide device 40 can comprise two side walls 42 fixed with respect to the outlet edge 22 and located on opposite sides of a respective longitudinal row 18 of products P. The side walls 42 of each guide device 40 can form a sort of channel oriented along the longitudinal direction A, which extends up to the outlet edge 22 of the belt conveyor 16. The side walls 42 can be provided at just one end portion of the belt conveyor 16 adjacent to the outlet edge 22.

In one or more embodiments, each guide device 40 can comprise a rear wall 44 located within the seat 28 of the respective receiving element 24. The rear wall can be movable in steps in a direction parallel to said longitudinal direction A. The movement of the longitudinal wall 44 can be a stepwise movement, with steps of width equal to the thickness of the products P or equal to the distance between adjacent compartments 34 of the respective receiving element 24, so that the successive products P falling from the outlet edge 22 are received in the receiving elements in offset positions along the respective axes C of the seats 28 of the receiving elements 24.

In one or more embodiments, each guide device 40 can comprise a front wall 46, which guides the products P that fall from the outlet edge 22 on the front side with respect to the direction of movement of the products P. In one or more embodiments, the front wall 46 may be movable between an inserted position and an extracted position with respect to the seat 28 of the respective receiving element 24. In the inserted position, the front wall 46 is inserted into the seat 28 of the respective receiving element 24. In the extracted position, the front wall 46 is located above and outside the seat 28 of the respective receiving element 24.

In one or more embodiments, the front wall 46 can be movable in steps in a direction parallel to the longitudinal direction A. In one or more embodiments, the front wall 46 can be carried by a lever 48 operated by an electric motor.

In one or more embodiments, the rear walls 44 of all guide devices 40 can be driven by a common motor. Likewise, the front walls 46 of all the guide devices 40 can be driven by a common motor. In one or more embodiments, independent actuation devices can be provided for controlling the movement of the front guide walls between the inserted position and the extracted position, and vice versa, and the movement of the front walls 46 in the direction parallel to the longitudinal direction A.

With reference to FIGS. 1 and 2, in one or more embodiments, the apparatus 10 can comprise an outlet conveyor 50 arranged to receive groups of products from the receiving elements 24. In one or more embodiments, the outlet conveyor 50 can be arranged to move the groups of products in the direction B, which is transverse to the longitudinal direction A. The outlet conveyor 50 can have a transport surface 52 provided with cross-bars arranged for pushing respective groups of products in the transport direction B. The outlet conveyor 50 can transport trays 54 (FIGS. 5-11), each of which can receive a respective group of products.

The trays 54 can be provided with seats equipped with recesses for receiving individual products P on edge. Alternatively, the trays 54 can be provided with smooth seats or rather without recesses, in which respective groups of products on edge are received and held, arranged with respective main walls in contact with each other.

FIGS. 5 to 11 illustrate an operation sequence of an embodiment of the apparatus 10. In the embodiment of FIGS. 5 to 11, the receiving elements 24 have smooth seats 28, i.e. without compartments for the respective products.

Figure 5:
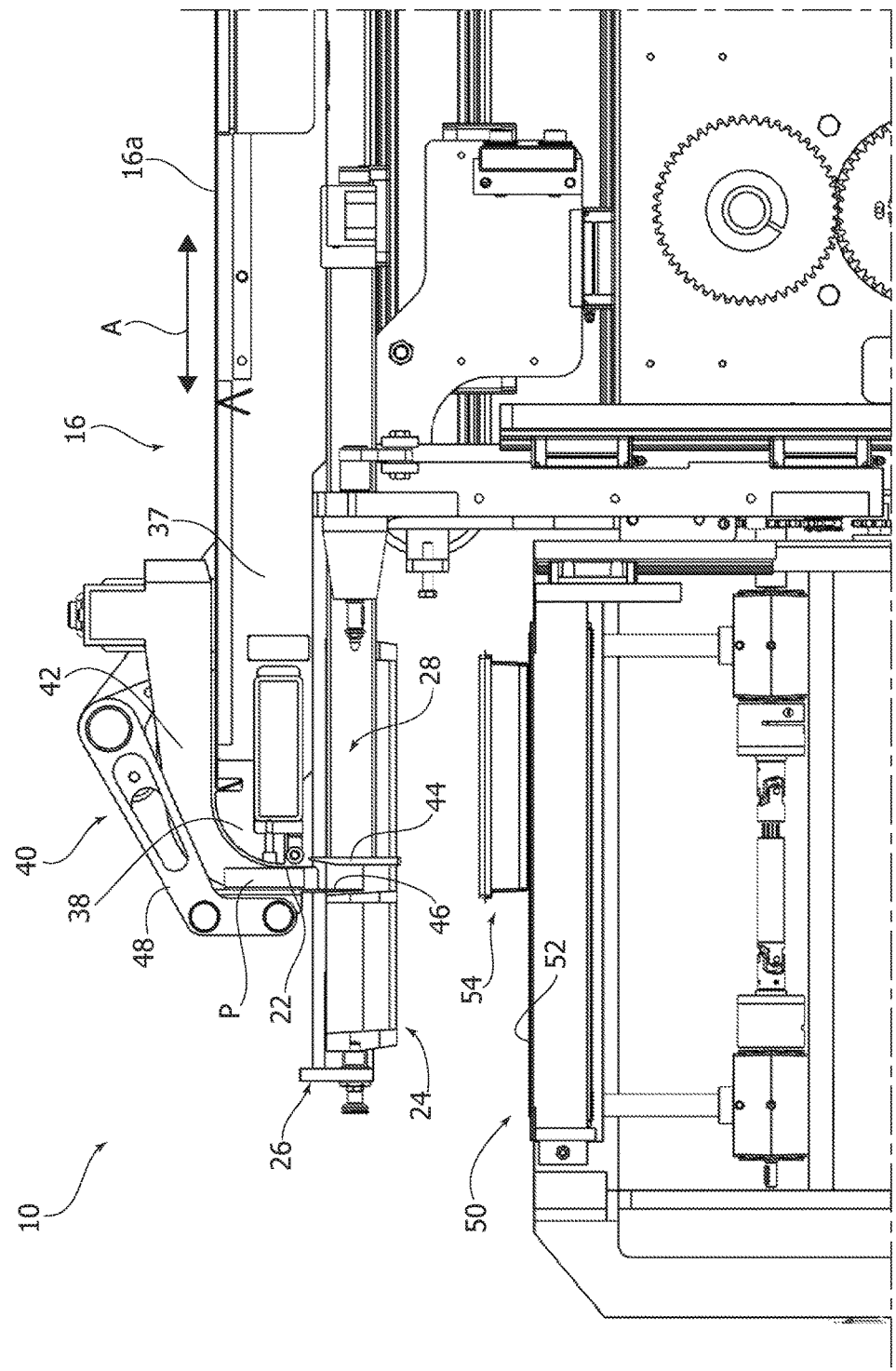
FIGS. 5 to 11 are schematic side views illustrating the operating sequence of an embodiment of the apparatus according to the invention.

FIG. 5 illustrates a condition in which a receiving element 24 is empty. The front wall 46 of the guide device 40 is inserted into the seat 28 of the receiving element 24. The rear wall 44 is spaced apart in a horizontal direction from the front wall 46 by a distance equal to the thickness of a product P. The side walls 42, the rear wall 44 and the front wall 46 form a path that rotates the products by 90° while the products move towards the outlet edge 22. FIG. 5 shows a single product P already rotated by 90° while it is about to fall from the outlet edge 22. The product P that falls off the outlet edge 22 of the belt conveyor 16 is guided between the front wall 46 and the rear wall 44.

Figure 6:
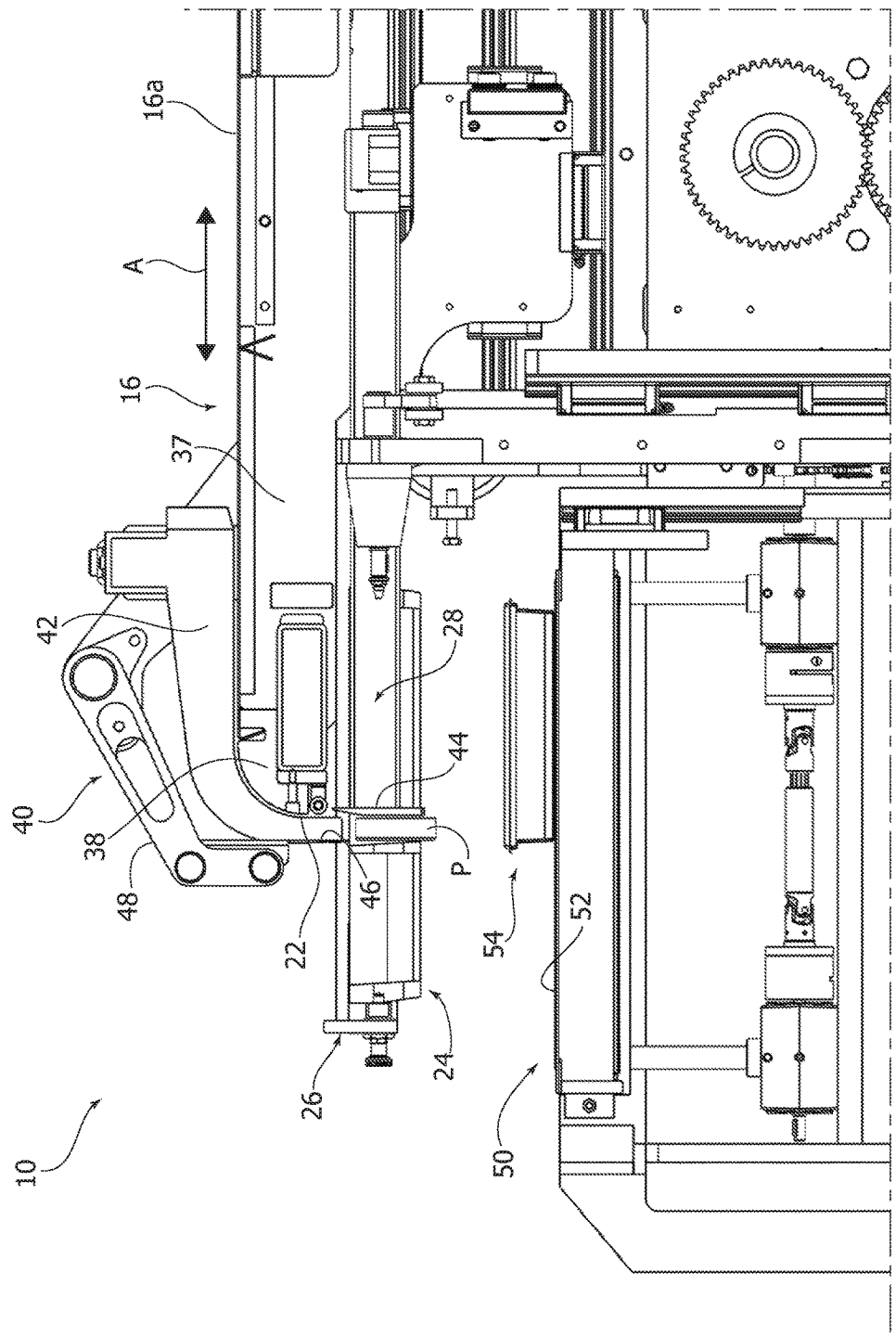
Figure 7:
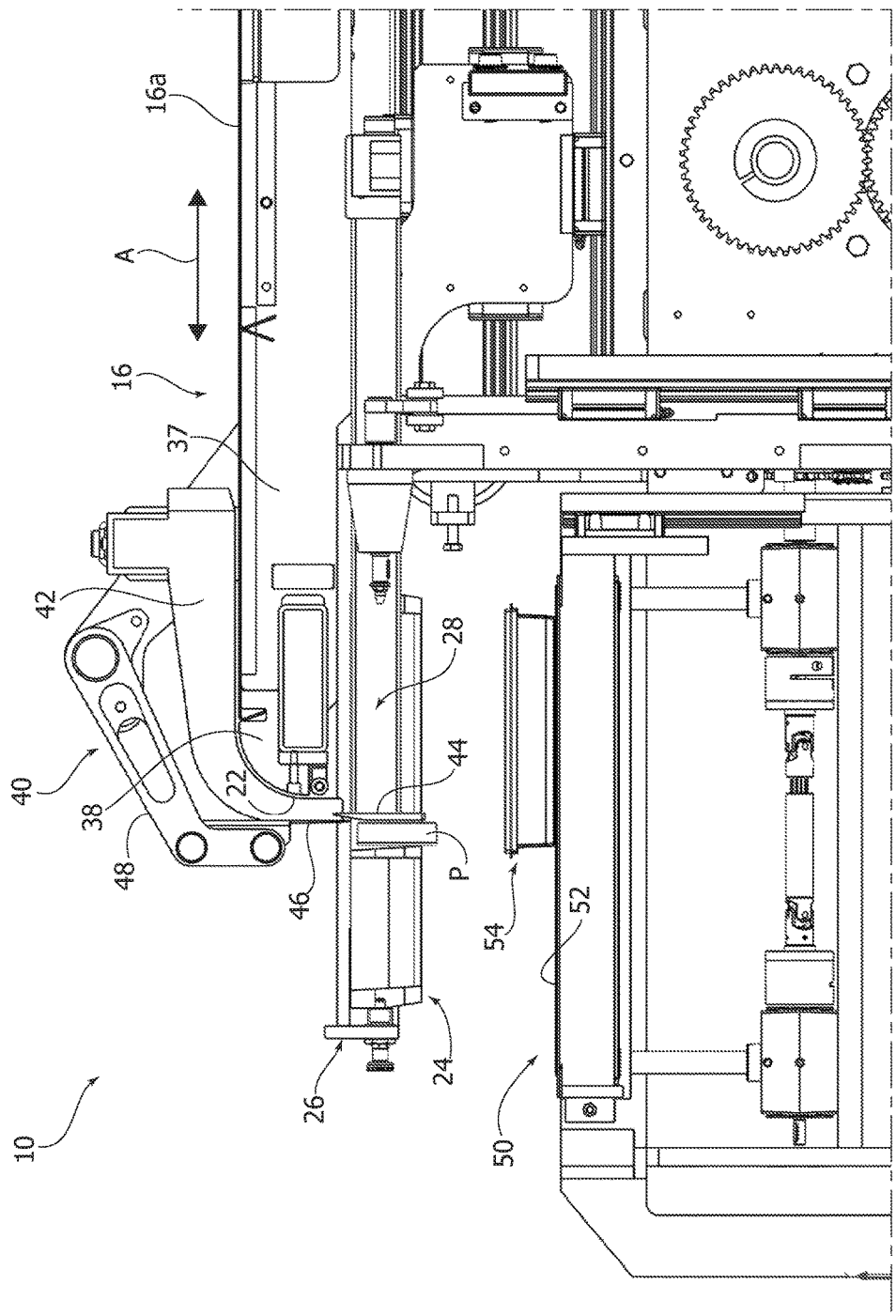

FIG. 6 illustrates the condition in which product P has fallen into the seat 28 of the receiving element 24. After a first product P has been positioned within the receiving element 24, the front wall 46 moves to the extracted position, as illustrated in FIG. 6. Thereafter, the outlet edge 22 of the belt conveyor 16 and the front wall 46 move one step in a horizontal direction and are arranged in the position shown in FIG. 7. In this stage, the rear wall 44 remains in contact with the rear wall of the product P and retains the product P in a vertical position within the seat 28.

Figure 8:
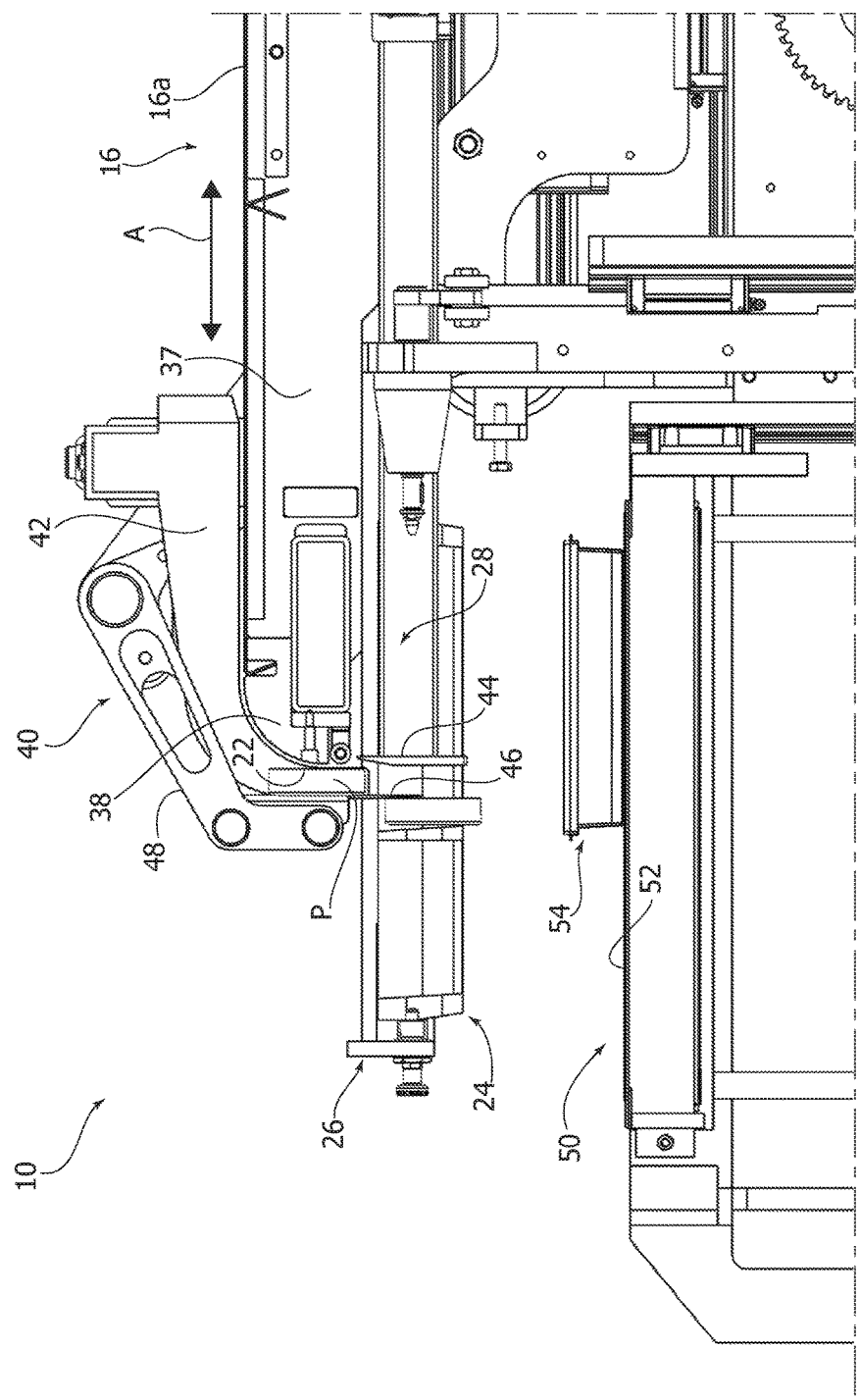

Then, as illustrated in FIG. 8, the front wall 46 is inserted into the seat 28, in contact with the rear wall of the product P previously positioned in the receiving element 24. The rear wall 44 moves one step in a horizontal direction. At this point, a second product P is guided into the seat 28 of the receiving element 24 in the space between the front wall 46 and the rear wall 44.

Figure 9:
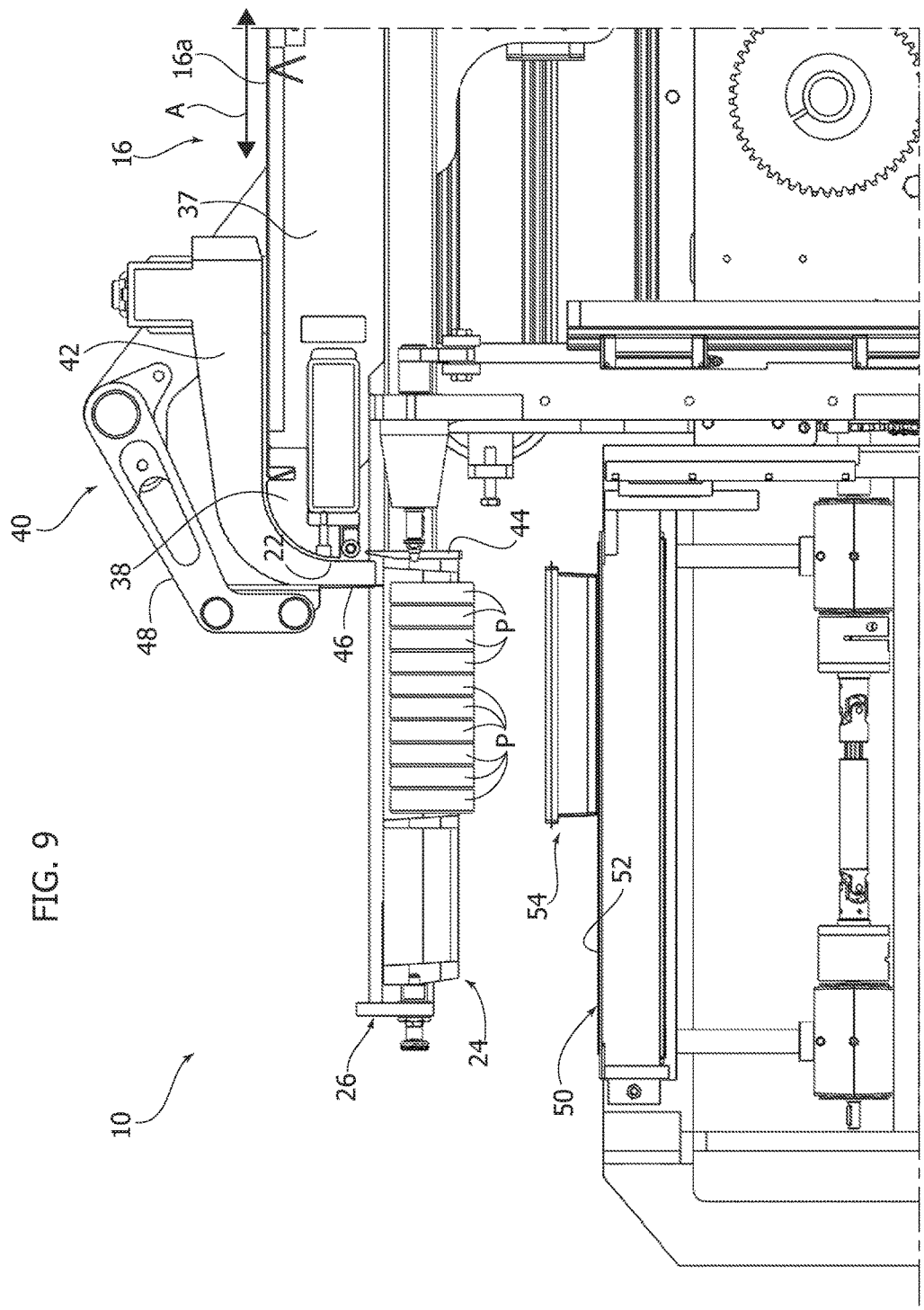

These operations are repeated in the same manner until the seat 28 of the receiving element 24 is filled with a predetermined number of products P arranged on edge, as shown in FIG. 9.

These operations occur simultaneously for all the receiving elements 24 of the apparatus 10, each of which receives the products P of a respective longitudinal row 18.

Figure 10:
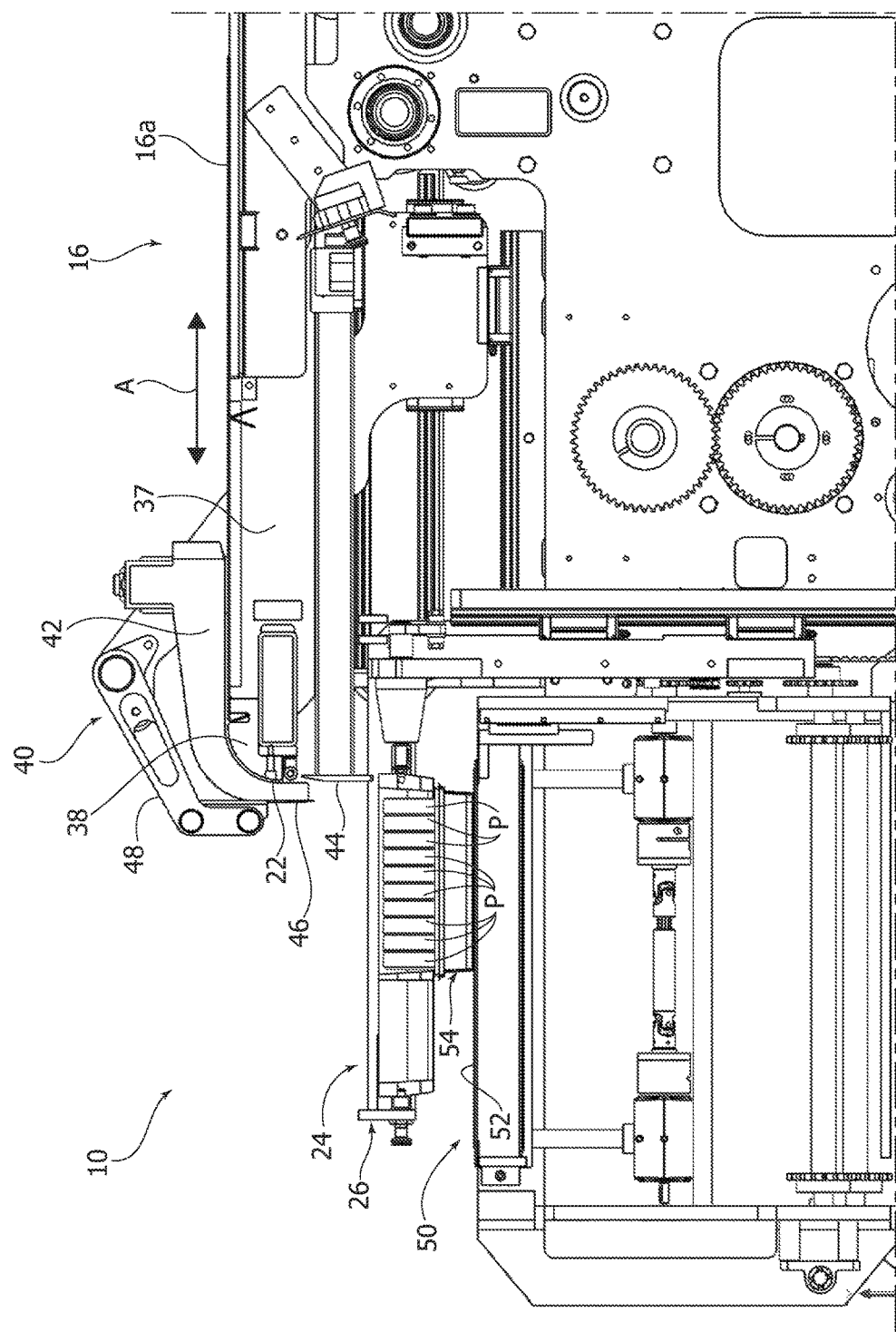
Figure 11:
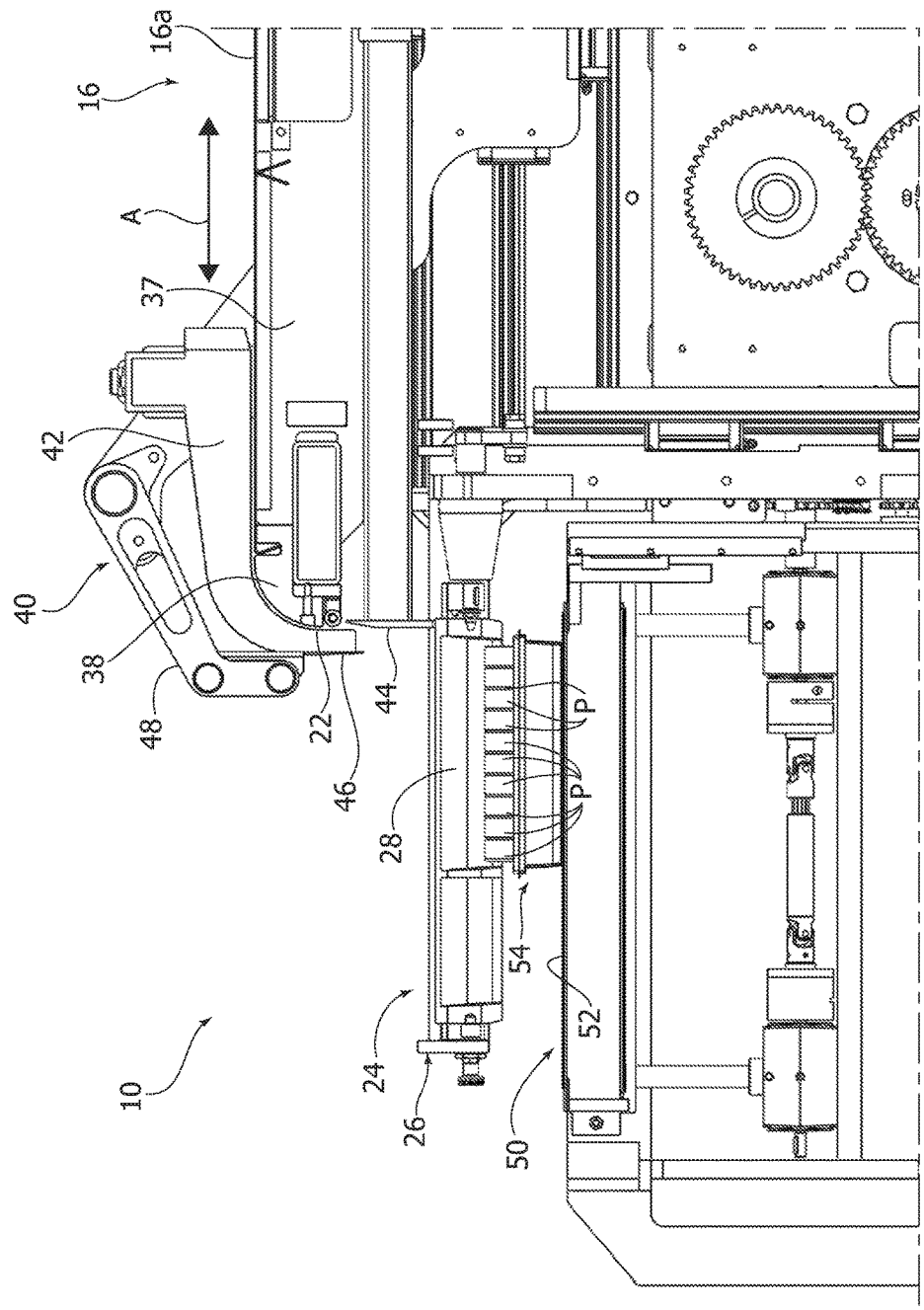

When the receiving elements 24 have been filled with a predetermined number of products, the frame 26 carrying the receiving elements 24 is lowered towards the transport surface 52 of the outlet conveyor 50 as illustrated in FIG. 10. On the conveyor 50, a plurality of trays 54 can be arranged, spaced apart in the transverse direction B by a step equal to the distance between the receiving elements 24 of the apparatus 10. The conveyor 50 is temporarily stopped in a position in which each tray 54 is positioned under a respective receiving element 24. As shown in FIG. 10, in the lowered position of the frame 26, the receiving elements 24 are positioned directly above the respective trays 54. At this point, as illustrated in FIG. 11, the receiving elements 24 are opened to drop the respective groups of products P into the respective trays 54, as shown in FIG. 11. The release of the groups of products P within the respective trays 54 can take place simultaneously for all the receiving elements 24.

After releasing the groups of products into the respective trays 54, the receiving elements 24 are returned to the closed position and the frame 26 is returned to the raised position. At this point, it is possible to restart a new cycle of filling the receiving elements 24, as previously described.

Of course, without prejudice to the principle of the invention, the details of construction and the embodiments can be widely varied with respect to those described and illustrated, without thereby departing from the scope of the invention as defined by the claims that follow.

The invention claimed is:

1. Apparatus for forming groups of products, comprising:
a belt conveyor having a transport surface movable in a longitudinal direction, wherein said transport surface terminates in an outlet edge where the products advancing on said transport surface fall by gravity;
a plurality of receiving elements having respective seats elongated along respective axes parallel to each other and parallel to said longitudinal direction, wherein said receiving elements are movable between a closed position in which the receiving elements are configured to receive and retain products in their respective seats and an open position in which the receiving elements are configured to release respective groups of products in a vertical direction; and
a plurality of guide devices associated with respective receiving elements and configured for guiding products that fall from said outlet edge to respective receiving elements, wherein the outlet edge of the belt conveyor and said receiving elements are provided with a stepped relative movement in said longitudinal direction, so that subsequent products that fall from the outlet edge of the belt conveyor are received in offset positions in said seats of said receiving elements.

2. An apparatus according to claim 1, wherein said guide devices form respective guiding paths along which the products rotate by 90° during the fall into the respective receiving elements.

3. An apparatus according to claim 1, wherein said receiving elements are stationary in said longitudinal direction and said outlet edge is movable in steps in said longitudinal direction.

4. An apparatus according to claim 1, wherein each of said guide devices comprises two side walls fixed with respect to said outlet edge, a rear wall located within the seat of the respective receiving element and a front wall, wherein the rear wall and the front wall are movable in steps with respect to the respective receiving element in a direction parallel to said longitudinal direction.

5. An apparatus according to claim 4, wherein said front wall is movable with respect to the respective receiving element between an inserted position and an extracted position.

6. An apparatus according to claim 1, wherein said receiving elements are movable in a vertical direction between a position for receiving the products and a position for releasing the groups of products.

7. An apparatus according to claim 1, wherein said seats of said receiving elements are provided with compartments for respective products aligned with each other in the direction of the respective axis.

* * * * *